(12) United States Patent
Wilson

(10) Patent No.: US 8,548,883 B2
(45) Date of Patent: Oct. 1, 2013

(54) SYSTEM AND METHOD FOR PROVIDING A LOAN TO A TAXPAYER

(75) Inventor: Robert D. Wilson, Shawnee, KS (US)

(73) Assignee: H&R Block Tax Services, LLC, Kansas City, MO (US)

( * ) Notice: Subject to any disclaimer, the term of this patent is extended or adjusted under 35 U.S.C. 154(b) by 1892 days.

(21) Appl. No.: 11/551,916

(22) Filed: Oct. 23, 2006

(65) Prior Publication Data

US 2007/0050277 A1    Mar. 1, 2007

Related U.S. Application Data

(63) Continuation of application No. 09/483,666, filed on Jan. 14, 2000, now Pat. No. 7,127,425.

(51) Int. Cl.
*G06Q 40/00* (2012.01)
*G06F 17/22* (2006.01)

(52) U.S. Cl.
USPC .............................. 705/35; 705/31; 705/36 T

(58) Field of Classification Search
USPC ................................................ 705/31, 35–42
See application file for complete search history.

(56) References Cited

U.S. PATENT DOCUMENTS

| | | | |
|---|---|---|---|
| 3,596,256 A | 7/1971 | Alpelt | |
| 4,718,009 A | 1/1988 | Cuervo | |
| 4,890,228 A * | 12/1989 | Longfield | 705/31 |
| 5,025,138 A | 6/1991 | Cuervo | |
| 5,025,372 A | 6/1991 | Burton et al. | |
| 5,138,549 A | 8/1992 | Bern | |
| 5,193,057 A * | 3/1993 | Longfield | 705/31 |
| 5,206,803 A | 4/1993 | Vitagliano et al. | |
| 5,394,487 A | 2/1995 | Burger et al. | |
| 5,536,045 A | 7/1996 | Adams | |
| 5,644,727 A | 7/1997 | Atkins | |
| 5,724,523 A * | 3/1998 | Longfield | 705/35 |
| 5,739,512 A | 4/1998 | Tognazzini | |
| 5,772,251 A * | 6/1998 | Fleck | 283/115 |
| 5,787,404 A | 7/1998 | Fernandez-Holmann | |

(Continued)

FOREIGN PATENT DOCUMENTS

| | | |
|---|---|---|
| GB | 2251100 | 8/1992 |
| WO | WO 98/04987 | 2/1998 |

(Continued)

OTHER PUBLICATIONS

"1040-ES Estimated Tax for Individuals 1998".*

(Continued)

*Primary Examiner* — Mohammad Z Shaikh
(74) *Attorney, Agent, or Firm* — Standley Law Group LLP

(57) ABSTRACT

A system and method for providing to a taxpayer a loan in an amount based on the taxpayer's estimated tax refund amount due for a current year, the loan being provided to the taxpayer prior to year end of the current tax year and prior to completion and filing of the taxpayer's current year tax return forms with a taxing authority. The taxpayer's estimated tax refund may be based on historical tax refund data as well as current year income data. A loan granting entity may consider the level of tax refunds that the taxpayer has received in previous years as well as income data for the first three quarters of the year to determine a reasonable estimate of the tax refund amount that the taxpayer will likely receive for the current tax year.

18 Claims, 2 Drawing Sheets

(56) References Cited

U.S. PATENT DOCUMENTS

| | | | |
|---|---|---|---|
| 5,787,405 A | 7/1998 | Gregory | |
| 5,878,405 A | 3/1999 | Grant et al. | |
| 5,903,876 A | 5/1999 | Hagemier | |
| 5,926,800 A | 7/1999 | Baronowski et al. | |
| 5,946,668 A | 8/1999 | George | |
| 5,963,921 A * | 10/1999 | Longfield | 705/31 |
| 5,991,736 A | 11/1999 | Ferguson et al. | |
| 6,003,016 A | 12/1999 | Hagemier | |
| 6,019,283 A | 2/2000 | Lucero | |
| 6,021,397 A | 2/2000 | Jones et al. | |
| 6,064,983 A * | 5/2000 | Koehler | 705/31 |
| 6,070,153 A | 5/2000 | Simpson | |
| 6,105,007 A | 8/2000 | Norris | |
| 6,105,865 A | 8/2000 | Hardesty | |
| 6,182,891 B1 | 2/2001 | Furuhashi | |
| 6,185,683 B1 | 2/2001 | Ginter et al. | |
| 6,202,052 B1 * | 3/2001 | Miller | 705/31 |
| 6,347,305 B1 | 2/2002 | Watkins | |
| 6,405,182 B1 | 6/2002 | Cuervo | |
| 6,473,500 B1 | 10/2002 | Risafi et al. | |
| 6,473,741 B1 | 10/2002 | Baker | |
| 6,532,450 B1 | 3/2003 | Brown et al. | |
| 6,546,373 B1 | 4/2003 | Cerra | |
| 6,625,582 B2 | 9/2003 | Richman et al. | |
| 6,829,588 B1 | 12/2004 | Stoutenburg et al. | |
| 7,010,507 B1 * | 3/2006 | Anderson et al. | 705/31 |
| 7,117,172 B1 | 10/2006 | Black | |
| 7,127,525 B2 * | 10/2006 | Coleman et al. | 709/247 |
| 7,742,958 B1 * | 6/2010 | Leek et al. | 705/31 |
| 7,765,132 B2 * | 7/2010 | Wilson et al. | 705/30 |
| 8,126,787 B1 * | 2/2012 | Leek et al. | 705/31 |
| 2002/0046110 A1 | 4/2002 | Gallagher | |
| 2003/0167225 A1 | 9/2003 | Adams | |
| 2004/0199422 A1 | 10/2004 | Napier et al. | |

FOREIGN PATENT DOCUMENTS

| | | |
|---|---|---|
| WO | WO9828699 | 7/1998 |
| WO | WO 00/22494 | 4/2000 |
| WO | WO 00/42583 | 7/2000 |
| WO | WO 01/15031 | 3/2001 |
| WO | WO 01/39077 | 5/2001 |

OTHER PUBLICATIONS

Pat Flynn. (Apr. 13, 1996). Loans on tax refund are costly fast bucks :[1,2,3,4,5,6,7 Edition]. The San Diego Union—Tribune,p. A-1. Retrieved Sep. 3, 2010, from ProQuest Newsstand.*

Block Financial to Offer Free Online Tax Preparation and Electronic Filing. (Dec. 15). PR Newswire,1. Retrieved Sep. 3, 2010, from Business Dateline.*

H&R Block Offering California Clients Free Refund Anticipation Loans. (Jan. 5). PR Newswire,1. Retrieved Sep. 3, 2010, from Business Dateline.*

Hock, Sandy. (Jan. 1995). Jackson Hewitt works around RAL crackdown. Accounting Today, 9(2), 2. Retrieved Sep. 3, 2010, from Accounting & Tax Periodicals.*

Kahan, Stuart. (Jun. 1995). The electronic filing debacle. The Practical Accountant, 28(6), 24. Retrieved Sep. 3, 2010, from ABI/INFORM Global.*

Business Editors, "Intuit Launces E-Tax Season with Quicken Turbo Tax for the Web; Analysts estimate more than 10,000 tax returns will be prepared online in 2000" Business Wire, Jan. 12, 2000.*

"H&R Block expands access to tax services", PR Newswire, Wednesday, Jan. 5, 2000.*

Flynn, Patt, "Loans on tax refund are costly fast bucks; [1,2,34,5,6,7 Edition]", The San Diego Union—Tribune. San Diego Calif: Apr. 13, 1996, pp. 1-4.*

"Block Financial to Offer Free Online Tax Preparation and Electronic Filing", PR Newswire. New York: Dec. 15, 1998. pp. 1-3.*

"H&R Block Offering California Clients Free Refund Anticipation Loans", PR Newswire. New York, Jan. 5, 2000, p. 1.*

Hock, Sandy, "Jackson Hewitt works around RAL crackdown", Accounting Today. New York: Jan. 16, 1995, vol. 9, iss 2; pp. 1-2.*

Kahan, Stuart, "The electronic filing debacle", The Practical Accountant, Boston: Jun. 1995. vol. 28, iss. 6, pp. 1-7.*

Business Editors, "Intuit Launches E-Tax Season with Quicken Turbo Tax for the Web; Analysts estimate more than 10,000 tax returns will be prepared online in 2000" Business Wire, Jan. 12, 2000, pp. 1-3.*

"H&R Block expands access to tax services", PR Newswire, Wednesday, Jan. 5, 2000, pp. 1-3.*

"AM-TAX Professional 1040, Accounting Technology", Oct. 1998, p. 30.*

Purple, Bruce, "Beneficial National Bank Lauches in-Branch Tax Service for Quick Refund", New York: Jan. 16, 1992, Sec. 1. p. 1.*

FastFile's Car Dealer Program Details, http://web.archive.org/web/20011214130849/www.fastfile.com/car/progDetails.html (Dec. 14, 2001), pp. 1-2.*

Giovetti, How to File Your Tax Return Electroncially, Compute, v15, n14, p. S9(3), Apr. 1993.

Gellis, Harold C., "How to Get Plugged in Electronic Tax Filing", Journal of Accountancy v17n6PP56-60, Jun. 1991, Dialog file 15 Accession No. 00553977.

Mannix, t's payback time, U.S. News & World Report, 1994, vol. 117, No. 11, p. 77.

Kemp, "Discover Debuts It's First Platinum card", DM News, Jan. 4, 1999, p. 2.

"Discover's Platinum May Stand Out in the Platinum Crowd", Credit Card News, Jan. 15, 1999.

"Your Platinum Partner Certificate Has Arrived", Discover Financial Services, Inc., date unknown.

Union Bank Offers Assistnace Program for Customers Affected by Southland Fires, Business Wire, Oct. 29, 1993.

First Interstate Bank will Donate $1 Million to Earthquake Relief, Offer Financial Aid to Earthquake Victims, PR Newswire, p0118LA025, Jan. 18, 1994.

Taxless Innovations Give Postal Service Run for its Money, PR Newswire, 0309SD005, Mar. 9, 1990.

1040-ES: Estimated Tax for Individuals 1998; Department of the Treasury Internal Revenue Service; pp. 1-7.

H & R Block TaxCut Press Release: 1999 Tax Season Releases; http://www.taxcut.com/taxcut/99_press_releases/99pr_h_andbships.html; pp. 1-2.

FastFile, Letter and Attachments from Randall Klein, General Manager, Fastfile, to Star Motors (Sep. 28, 1996).

Nelco, Inc. and AM Software, AM Software/Nelco Agreement for 1994 Tax Season, (Sep. 8, 1994).

A Summary of the Roundtable Discussion on Stored-Value Cards and Other Prepaid Products, Fed. Res. Board, http://federalreserve.gov/paymentsystems/storedvalue/, last updated Jan. 12, 2005.

All for one—but not yet one for all, Loc. Gov't IT Use, Mar./Apr. 1999, at 17.

Amended and Restated Refund Anticipation Loan Participation Agreement, Jan. 2003, available at: http://contracts.onecle.com/hrblock/household.loan.2003 .0 1.06.shtmi.

AM-TAX Professional 1040, Accounting Technology, Oct. 1998 at 30.

Christoslav Anguelov et al., U.S. Consumers and Electronic Banking: 1995-2003, Fed. Res. Bull, Winter 2004, at 1-18.

Antoinette Alexander, The Internet Rules Tax Filing Season, Acct. Tech., Jan./Feb. 2000, at 52.

Joanne Ball Artis, Fees for Speedy Tax Refunds Decried for High Interest Rate Tax Filing Firm Defends Practice as a Favor to Consumer, Boston Globe, Feb. 17, 1993, at 7.

Bank Card Report: POS: Is the Future Now?, ABA Banking J., Sep. 1986, at 66.

Bank machine benefits offer, Gov't Computing, Dec. 1998, at 8.

Michael S. Barr, Banking the Poor (Univ. Mich. Law Sch., Working Paper No. 49, 2004).

Matt Barthel, Star's Explore Unit Merging With Cactus POS Network, AM. Banker, Mar. 11, 1994, at 1.

Jennifer Bayot, For Some Taxpayers the Refund is in the Plastic, N.Y. Times, Feb. 1, 2004, at BU8.

*Beckett v. H&R Block, Inc.*, No. 94-C-776, 1994 WL 698505 (N.D. Ill. Dec. 12, 1994).

Eamon Beltran, H&R Block to Enhance Tax, Financial Services, Dow Jones News Service, Nov. 17, 1999.
Tom Bengston, W. Union Reaches the Unbanked with Quick Cash, N. W. Fin. Rev., Jun. 27, 1998, available at http://findarticles.comlp/articles/mtqa3799/is_199806/ai_n87953 75/print?tag=artBody;c011.
Alan Berube et al., The Price of Paying Taxes: How Tax Preparation and Refund Loan Fees Erode the Benefits of EITC, The Brookings Inst., Progressive Policy Inst., May 2002, available at http://www.brookings.edu/reports/2002/05taxes_eitc.aspx.
Sondra G. Beverly and Coleen Dailey, Using Tax Refunds to Promote Asset Building in Low-Income Households: Program and Policy Options, Center for Soc. Dev., George Warren Brown School of Soc. Work, Wash. D., Oct. 2003, available at http://gwbweb.vvustl.edu/csd/Publications/2003/PolicyReport-TaxRefund.pdf.
Blair's citizen card scheme, Gov't Computing, Nov. 1998, at 5.
Joseph Bondar, Social Security Beneficiaries Enrolled in the Direct Deposit Program, Dec. 1996, Aug. 1998, at 52.
Bill Brandel, Micro-To-Host Links: Data Link Speeds Tax Filing, Refunds, Computerworld, Mar. 28, 1988, at S7.
Lynn Brenner, NY Thrift Promotes Tax Service Dollar Dry Dock Offers Refund in Advance of IRS Payment, AM. Banker, Feb. 2, 1989, at 10.
Scott Bronstein, A Check-Writing Nation Ignores the Debit Card, N.Y. Times, Oct. 6, 1985, § 3, at 12.
Amy Brown et al., Refund Loan Products and VITA: A Summary of Issues and Options, Nov. 2004, http://www.responsiblelending.org/pdfs/RALs-Summary-1104.pdf.
Jim Brown, Ways to Pay, Network World, Aug. 29, 1988, at 29.
Businesswire, Sweepstakes and Free Refund Estimation Highlight SecureTax Incentives, Jan. 13, 1998.
Carbiz.com Inc., Annual Report, Form 20-F SEC Filing (Jan. 31, 2000).
Carbiz.com Acquires Tax Max Service Group Inc., Carbiz.com Inc., Apr. 25, 2000, http://www.carbiz.comlShowRelease.asp?RecordID=43.
Carbiz. com Acquires Tax Max Service Group Inc., The Auto Channel, Apr. 25, 2000, http://www.theautochannel.comlnews/press/date/20000425/pressO13905.html.
CashMoney®, http://www.cashmoney.ca/main.html (last visited Nov. 10, 2008).
Brian Cayton, Low-Cost Software Open New Windows on Financial Planning, Accounting Technology, Jul. 1996.
Cendant's Juggernaut: The Growth of the World's Largest Real Estate Company, Oct. 11, 1997, available at http://74.125.45.l04/search?q=cache:nn_KrnE45prcJ:www.remaxcahi.com/esource/franchisee/forms/cendant.
pdf+%E2%80%A2+Cendant%E2%80%99s+Juggernaut,+Oct.
+11,+1997&hl=en&ct=clnk&cd=1&gl=us.
Julia S. Cheney, Payment Cards and the Unbanked: Prospects and Challenges, Fed. Res. Bank Philadelphia, Jul. 13-14, 2005, available at http://www.philadelphiafed.org/payment-cardscenter/events/conferences/2005/PaymentCardsandtheUnbankedSummary.pdf.
Julia S. Cheney, Prepaid Card Models: A Study in Diversity, Fed. Res. Bank Philadelphia, Mar. 2005, available at http://www.philadelphiafed.org/payment-cardscenter/publications/discussion-papers/2005/PrepaidCardModels_Palmer_FINAL.pdf.
Prepay? ABA Banking Journal, vol. 86, No. 471 72, Apr. 1994.
Citibank Joins Efforts to Assist 'Unbanked', Bank Tech. News, Jan. 1999, at 23.
Paul Clolery, H&R Block Tests Mastercard; AICPA 's New Card Adds Benefits, Prac. Acct., May 1993, at 10.
Steve Cocheo, Beneficial parentage, ABA Banking J., Jul. 1997, at 44.
Michael Cohn, Linking Planning to Tax Prep, Accounting Technology, Feb./Mar. 1997, at 49-56.
Michael Cohn, Tax Prep Software 1040 Tax Prep Update, Accounting Technology, Feb. 1995, at 27-34.
Shawn Allen Cole et al., Where Does It Go? Spending by the Financially Constrained (Harv. Bus. Sch. Fin., Working Paper No. 08-083, Apr. 11, 2008).
Colorado v. Cash Now Store, Inc., 12 P.3d 321 (Colo. Ct. App. 2000).
Consultation Paper on Framework Options for Addressing Concerns with the Alternative Consumer Credit Market, ACCM Working Group, Consumer Measures Committee, Autumn 2002, available at http://cmcweb.ca/epic/site/cmccmc.nsf/vwapj/CMC_credit_e.pdf/$FILE/CMC_credit_e.pdf.
Consumer Action News: EBT/EFT Update (1998), Jul. 1, 1998, http://www.consumeraction.org/news/articles/ebt_eft_update_1998/.
Antoinette Coulton, Nations Bank Testing Visa Cash at Air Force Base, AM. Banker, Jul. 15, 1998, at 13.
Council plans bank machine pay-outs, Gov't Computing, Feb. 1999, at 5.
Eileen Courter, Debit Cards Come of Age, Credit Union Mgmt., Feb. 1996, at 36.
Debit Payoff, Card Fax, Nov. 13, 1998, at 2.
Paul Demery, Tax Planning Draws a Crowd—Tax Software Vendors Compete in What Was Once a One-Horse Race, Accounting Technology, Dec. 1998.
Dey Delrio and Chris Kelley, A Primer on Fringe Products Associated with RALs, Nov. 2004, http://www.responsiblelending.org/issus/refund/briefs/.
Discover's Platinum May Stand Out in the Platinum Crowd, Credit Card News, Jan. 15, 1999.
Ryan Donmeyer, IRS Takes Aim at RAL Fraud, Hits Return Preparer Profits, 66 Tax Notes 1088 (Feb. 20, 1995).
Daniel Dunaief, Mellon Leads $1.25B Loan to Underpin H&R Block's Tax Refund Loan Program, AM. Banker, Nov. 7, 1996, at 20.
Electronic Tax filing: fast track to fraud?, Bank Tech. News, Sep. 1995, at 6.
Electronic Transfer Account: Frequently Asked Questions, http://www.etafind.gov/ETAFactsPage5.cfm.
Electronic Transfers: Use by Federal Payment Recipients Has Increased but Obstacles to Greater Participation Remain: General Accounting Office Rep. to the Subcomm. on Oversight and Investigations of the H Comm. on Financial Services, GAO-02-913 (Sep. 2002).
Gregory Elliehausen, Consumer Use of Tax Refund Anticipation Loans (Geo. U., Credit Res. Center, Monograph #37, Apr. 2005).
FastFile's Car Dealer Program Details, http://web.archive.org/web/20011214130849/www.fastfile.com/car/progDetails.html (Dec. 14, 2001).
FastFile's Manufactured Housing Program Details, http://web.archive.org/web/20020208132040/www.fastfile.com/manHouse/progDetails.html (Feb. 8, 2002).
Nancy Ferris, Embracing Electronic Commerce, Gov't Executive, Jan. 1998, at 49.
The Financial Post Company, The Financial Post Guide to Investing & Personal Finance: Retirement Planning, Mar. 14, 1998.
Paul Finch & Ray Haynes, Research Isolates Deposit Gains from EFT Technology, Bank SYS. & Equipment., Mar. 1988, at 58.
First Data Corp., Annual Report, at 4, 20 (1998).
Food Stamp Electronic Benefit Transfer Systems: U.S. Dept. Agriculture Rep. to the H Comm. on Agriculture and the S. Comm. on Agriculture, Nutrition, and Forestry (Oct. 2003), available at http://www.fns.usda.gov/FSP/ebt/pdfs/2003_congress.pdf, last updated Jun. 23, 2009.
Food Stamp Program: Frequently Asked Questions About FTP, http://www.fns.usda.gov/fsp/ebt/FAQ.htm.
John R. Galvin, Banc One Corp., Testimony Before the Nat'l Comm'n. on Restructuring the I.R.S. (Jan. 30, 1997), available at http://www.house.gov/natcommirs/galvin.htm.
Harold C. Gellis, How to Get Plugged Into Electronic Tax Filing, 1. Accountancy, Jun. 1991, at 56.
Lisbeth K. Green, Payroll Cards: How and Why to Make Them Work for Your Organization, Paytech, Mar. 12, 2002, at 16.
Green v. H&R Block, Inc., 735 A.2d 1039 (Md. 1998).
George Guttman, Electronic Filing: Who Pays, Who Benefits, 66 Tax Notes 1750 (Mar. 20, 1995).
Mike Hogan, Drat! It's Tax Time Again, PC World Online, Dec. 17, 1999, at 1.
Household Bank v. JFS Group, 320 F.3d 1249 (11 th Cir. 2003).
Karen Hube, A Special Summary and Forecast of Federal and State Tax Developments, Wall Street J., Dec. 29, 1999, at Al.

Internal Revenue Service Res. Div., Specifications for Direct Deposit of Individual Income Tax Refunds (Oct. 15, 1986).
Internal Revenue Service Res. Div., Specifications for Electronic Filing of Income Tax Returns (Oct. 15, 1986).
Interpretations—Jan. 1 to Mar. 31, 2002, Off. Comptroller Currency Q. J., Jun. 2003, at 115.
IRS Refund Glitch Sees Banks Stiffed, Associated Press, Feb. 6, 1992, available at http://www.ap.org.
Kelly Jackson, Transmit It To The IRS, Communications Week, Apr. 2, 1990, at 8.
Katy Jacob et al., Stored Value Cards: Challenges and Opportunities for Reaching Emerging Market, Fed. Res. Board, 2005 Res. Conf., available at http://www.ny.frb.orglregional/svc_em.pdf.
David Cay Johnston, Beneficial Sues Over Who Gets IRS Refunds, Oregonian, Feb. 22, 1995, at D2.
David Cay Johnston, Company News; Bank Challenges IR.S. on Refunds for Borrowers, N.Y. Times, Feb. 22, 1995.
Judge Advoc. Gen.'s Sch., Consumer Law Guide, Ch. 6 (Oct. 9, 2003) available at http://web.archive.org/web/20031009214055/http://www.louisvillelaw.com/federaVArmy Pubs/JA+265+-+Consumer+Law+Deskbook+(2000).pdf.
Ajit Kambil and James E. Short, Electronic Integration and Business Network Redesign: A Roles-Linkage Perspective, J. Mgmt. Info., Spring 1994, at 59.
Howard Karger, America's Growing Fringe Economy, Dollars & Sense Magazine, Nov./Dec. 2006.
Jacob Katy, Stored Value Cards: A Scan of Current Trends and Future Opportunities (Center Fin. Services Innovation, Research Series White Paper No. 1, Jul. 2004).
Charles Keenan, Citi to Issue Debit Cards Through Check Cashers, AM. Banker, Jan. 19, 1999, at 18.
Ted Kemp, Discover Debuts It's First Platinum Card, DMNEWS, Jan. 4, 1999, at 2.
Lenna D. Kennedy, OASDI Beneficiaries and SSI Recipients With Representative Payees, Soc. Security Bull., Winter 1995, at 115.
Andrew Kitching and Sheena Starky, Payday Loan Companies in Canada: Determining the Public Interest, Parliamentary Info. Res. Service, Jan. 26, 2006, available at http://www.parl.gc.ca/information/library/PRBpubs/prb0581-e.html.
James R. Kraus, Beneficial's Tax Refund Lending Program Seen as On-Course After Pullout from Earned Income Side, AM. Banker, Mar. 8, 1995.
Victor Kremer, Finance Co. Readies First Lottery Bonds, Bondweek, Apr. 13, 1998, at 1.
Jeffrey Kutler, Chevron to Take Debit Cards by '92 at Service Stations, AM. Banker, Sep. 7, 1988, at 12.
Jeffrey Kutler, Explore-Cactus Deal is Crowning Glory for Pioneer in Electronic Funds Transfer, AM. Banker, Mar. 11, 1994, at 15.
Jeffrey Kutler, TV Expedites Validation of Visa Charges, AM. Banker, Jul. 20, 1988, at 1.
Letter from Thomas M. Bloch, H&R Block, Inc. to Bernie Radack, Internal Revenue Servo (Mar. 31, 1999).
Diane E. Lewis, It's All in the Card: For Some Employers, Paper is Giving Way to Plastic on Payday, Boston Globe, Feb. 15, 2004.
M2 Presswire, Microsoft: Microsoft Teams With SecureTax. com to Provide Electronic Tax Filing on MSN MoneyCentral, Feb. 19, 1999.
Michael F. Lynch, The Age of Electronic Filing, J. Acct., Nov. 1993, at 30.
Gene G. Marcial, Watch Out, H&R Block, Inside Wall Street, Businessweek Online, Nov. 10, 1997.
Steven Marjanovic, Arizona Clearing House Chief Eyes Expansion, AM. Banker, Aug. 18, 1995, at 16.
Laura Lou Meadows, Electronic Filing Speeds Refunds, N.Y. Times, Mar. 5, 1989, § 3, at 27.
Gene Meyer, Block Joins IRS Program to Cut Costs of Fast Refunds: Debt Indicator Will Also Be a Tool in Fighting Fraud, Kansas City Star, Nov. 18, 1999.
Gene Meyer, H&R Block Joins IR.S. Program That May Trim Cost of Quick Refunds, Kansas City Star, Nov. 18, 1999.
Ware Myers, On Trial at the Summer Olympics: Smart Cards, Computer, Jul. 1996, at 88.
Timothy J. Mullaney, IR.S. Fraud Watch Cuts Refund Loans, Baltimore Sun, Mar. 12, 1995, at ID.
NaCCA Announces New Debit Card Program, Bus. WIRE, Jan. 11, 1999, available at http://www.businesswire.com.
NaCCA, Citigroup Target 'Unbanked', Bank Sys. & Tech., Mar. 1999, at 10.
Nat'l Taxpayer Advocate, 2007 Objectives Report to Congress: vol. II—The Role of the IRS in the Refund Anticipation Loan Industry, Jun. 20, 2006, available at http://www.irs.gov/pub/irs-utl/nta_fy07_final_objectives_report_071206.pdf.
No. 1 Rated TaxCut Software for the 1999 Tax Year Ships to Retail Stores, Bus. WIRE, Dec. 6, 1999, available athttp://www.businesswire.com.
Terrence O'Hara, Santa Barbara Bank Decides to Rethink its Refund Anticipation Loan Business, AM. Banker, Jun. 23, 1995, at 6.
Pacific Capital Bancorp, Form 10-Q SEC Filing (May 17, 1999).
Pacific Capital Bancorp, Inc., Form 10-0 SEC Filing (Nov. 15, 1999).
Kelly Palmer, Local Firm Offers Instant Tax Returns, Springfield Bus. J., Jan. 22, 1990, at 1.
James F. Peterson & Keith A. Washington, Why Electronic Tax Filing is Hot, J. Acct., Oct. 1993, at 68.
Jim Peterson, Get with the program! The IRS ELF, Nat'l Pub. Acct., Nov. 1993, at 42.
Maureen Pirog et al., The Expanding Role & Efficacy of E-Government Innovations in US Social Services (Higher Sch. of Econ., Moscow, Russ., Apr. 2007).
Travis Plunkett, Legislative Dir. Consumer Fed'n of AM., Remarks Before the Senate Comm. on Banking, Housing and Urban Affairs: An Examination of the Gramm Leach Bliley Act Five Years After Its Passage (Jul. 13, 2004).
Marcus Pollet, New plans on the cards, Gov't Computing, Oct. 1996, at 8.
Theodore Postel, Lottery Prize: Assignment of Benefits, Chi. Daily L. Bull., Dec. 19, 1995, at 1.
Press Release, Employee Solutions, Inc., Employee Solutions Partners with Bank One; Plan for a Debit Card Announced (Nov. 12, 1998) (PR Newswire Assoc. Inc.).
Press Release, First Data Corporation, CSRG is First National User of NTS Debit Card for Remote and 'Unbanked' Employees (Aug. 15, 1997) (PR Newswire Assoc. Inc.).
Press Release, H&R Block Inc., H&R Block Tests Low-Rate Credit Card in Select Markets (Mar. 4, 1993) (PR Newswire Assoc. Inc.).
Press Release, H&R Block Inc., H&R Block to Offer Internet Tax Preparation and Electronic Filing at hrblock.com (Nov. 22, 1999) (PR Newswire Assoc. Inc.).
Press Release, Woodbridge Sterling Capital, LLC, Woodbridge Sterling Capital to Issue Securities Backed by Cash Flows From Lottery (Jul. 31, 1997) (PR Newswire Assoc. Inc.).
PR Newswire, Yahoo! Finance Unveils Tax Center, Feb. 1, 1999.
Program Overview—Bank One Visa Cash Cards, http://www.visacash.orgfbankone.html (last visited Nov. 11, 2008).
Bruce Purple, Beneficial National Bank Launches in-Branch Tax Service for Quick refund, Bus. Wire, Jan. 16, 1992, available at http://www.businesswire.com.
Jane Bryant Quinn, Borrowing is Expensive Way to Get Tax Refund Money Fast, Baltimore Sun, Feb. 23, 1998, at 13C.
Jane Bryant Quinn, Separating Fact From Fiction on Federal Checks and Direct Deposit, Wash. Post, Jun. 6, 1999, at H2.
Kristina Rasmussen, From Government's Coffers to Our Wallets: Why Americans Need Choices in Tax Refund Delivery Services (Nat'l Taxpayer's Union, Issue Brief No. 163, Apr. 16, 2007), available at http://www.ntu.org/main/pressJssuebriefs-.printable.php-?PressID=924&org_name=NTU.
Refund Anticipation Loans: Before the Subcomm. on Consumer Credit and Insurance of the H Comm. on Banking, Finance and Urban Affairs, 103rd Congress (1994).
Request to Reopen and Modify Consent Order, In the Matter of Beneficial Corporation, et al., No. D-8922 (F.T.C. May 27, 1986).
Sherris L. Rhine et al., Householder Response to the Earned Income Tax Credit: Path to Sustenance of Road to Asset Building (Fed. Res. Bank N.Y., 2005), available at http://www.chicagofed.orglcedric/promises-'pitfalls_2005_conference_session2.cfm.
Howard Rudnitsky, Tax Play, Forbes, May 11, 1992, at 48.
Sainsbury Reward Card Extended to More Third Party Retailers, Retail Rev., Jan. 1999, at 12.

Elizabeth R. Schiltz, The Amazing Elastic, Ever-Expanding Exportation Doctrine and Its Effect on Predatory Lending Regulation, 88 Minn. L. Rev. 525 (Feb. 2004).
Robert W. Scott, E-Filing Vendors Outraged Over Death of DDI, Acct. Today, Nov. 21, 1994, at 1.
*Silver v. H&R Block, Inc.,* 105 F.3d 394 (8th Cir. 1997).
Peter Skillern and Adam Rust, The High Cost of Refund Anticipation Loans in North Carolina, Cmty. Reinvestment Ass'n of N.C. (Jan. 25, 2007), available at http://www.ncimed.com/docs/2006_RALReport.pdf.
Slow roll out, and still thin on the ground, Gov't Computing, Jan. 1999, at 24.
Smart City, Gov't Computing, Sep. 1999, at 10.
Social Security Beneficiaries Enrolled in the Direct Deposit Program, Dec. 1996, Soc., Soc. Security Bull, Jan. 1998, at 52.
State Recognition of Paycards (Am. Payroll Assoc., Feb. 2008).
Michael A. Stegman et al., The State of Electronic Benefit Transfer (EBT) (Dec. 2003) (on file with Center for Community Capitalism: The University of North Carolina at Chapel Hill).
Beth Stetenfeld, The Power of Electronic Tax Filing, Credit Union Mgmt., Oct. 1993, at 32.
Lewis Taub, Is Electronic Filing for You?, Small Bus. Rep., Jan. 1994, at 63.
Tax Max Service Group Inc., TaxMax Auto Dealer Electronic Filing System: 200112002 Tax Season Reference Guide (Revised Sep. 26, 2001).
Tax Refund Services About Us, http://web.archive.org/web/20010815215505/www.taxrefundservices.com/aboutus.htm (Aug. 15, 2001).
Tax Refund Services Car Dealerships, http://web.archive.org/web/20011216094735/www.taxrefundservices.com/cardealerships.htm (Dec. 16, 2001).
Tax Refund Services FAQ, http://web.archive.org/web/20010825032936/www.taxrefundservices.com/faq.htm (Aug. 25, 2001).
Tax Refund Services How It Works, http://web.archive.org/web/20010419201055/www.taxrefundservices.com/howitworks.htm (Apr. 19, 2001).
Tax Refund Services TRS Tax Marketing Program: Making It Easier to Buy a Car, Slide Show and Tax Marketing Agreement, http://web.archive.org/web/20010419201055/www.taxrefundservices.com/howitworks.htm (Apr. 19, 2001).
Tax Refunds for H&R Block Customers, Army Law, Aug. 1989, at 45.
TaxStar's Refund for Down Payment Program, http://dealers.taxstaronline.com, (last accessed Aug. 3, 2009).
TaxStar's Refund for Down Payment Program: Benefits of the Program, TaxStar Dealership Portal, http://dealers.taxstaronline.com/benefits.php (last accessed Aug. 3, 2009).
TaxStar's Tax Refund for Down Payment Program: The Process, TaxStar Dealership Portal, http://dealers.taxstaronline.com/process.php (last accessed Aug. 3, 2009).
Texas Capital Bank Launches New Payroll Platform, Bus. WIRE, Nov. 12, 1999, available at http://www.businesswire.com.
The 2004 Federal Reserve Payments Study (Fed. Reserve Sys., Dec. 2004), available at http://www.frbservices.org/files/communications/pdf/research/2004PaymentResearchReport.pdf.
The Price of Loyalty—Safeway Raises the Stakes, Retail Rev., Apr. 1998, at 5.
*Turner v. Beneficial Nat'l Bank*, No. 98-c-2550, 2003 WL 24280981 (N. D. III. Sep. 10, 2003).
UK Government scraps benefit payment project, Electronic Gov't Int'l, Jun. 1999, at 1.
United States: First Data NTS launches innovative debit card, Electronic Payments Int'l, May 1997, at 3.
U.S. Appl. No. 75/309,970, filed Jul. 22, 1999.
U.S. Appl. No. 78/199,430, filed Jan. 2, 2003, first used in commerce Jan. 11, 2001.
Matthew Vadum, Company Cashes in on Lottery Bonanzas, Cent. Penn Bus. J., Apr. 17, 1998, at 4.
Mary Vanac, Florida Car Dealers Will Do Your Taxes, Let You Drive Home in Refund, Knight-Ridder Trip. Bus. News: Akron (Ohio) Beacon J., Mar. 5, 1999.
Virginia Men Implicated in Loan Scheme, Wash. Post, May 24, 1987, at B4.
VISA Taps IFS for Global Cash Card Pilots, Bus. Wire, May 5, 1997, available at http://www.businesswire.com.
Betsy Wade, Practical Traveler; V.A.T. Refunds: Vexations Added, N.Y. Times, Oct. 11, 1998, § 5, at 4.
Elspeth Wales, Marriages of convenience, Retail Sys., Sep. 1998, at 18.
Western Union Fin. Serv., Inc. & Basin Indus. Bank, Benefits Quick Cash Agreement and Disclosure Statement (Jun. 1, 1998).
Western Union Fin. Serv., Inc., Benefits Quick Cash Program: Answers, 1998.
Western Union Fin. Serv., Inc. & Basin Indus. Bank, Cash Card Agreement and Disclosure Statement (Sep. 1, 1998).
Western Union Fin. Serv., Inc., Federal Benefits Checks Are Going Away—Don't Let Your Customers Go With Them, 1998.
Western Union Fin. Serv., Inc., Newsbriefs (Spring 1990).
Western Union Fin. Serv., Inc., Only Western Union (product brochure).
Western Union Fin. Serv., Inc., Now When You Need Cash Reachfor the Card, 1998.
Western Union Fin. Serv., Inc., Prepare Now for EBT and Keep Serving Your Customers, 1998.
In re: Western Union Interim Corp. (Fed. Deposit Ins. Corp. Jul. 7, 1998) (Order and Basis for Corporation Approval), available at http://www.fdic.gov/regulations/laws/bankdecisions/merger/westernunion.html.
Louis Whiteman, New Company Targets its Hybrid Debit Card to Unbanked Hispanics, AM. Banker, Jan. 22, 1999, at 6.

* cited by examiner

SYSTEM AND METHOD FOR PROVIDING A LOAN TO A TAXPAYER

CROSS REFERENCES TO RELATED APPLICATIONS

This application is a continuation application of U.S. patent application Ser. No. 09/483,666, entitled SYSTEM AND METHOD FOR PROVIDING A LOAN TO A TAXPAYER BASED ON A PRE YEAR-END TAX REFUND filed on Jan. 14, 2000, now U.S. Pat. No. 7,127,425, issued Oct. 24, 2006.

BACKGROUND AND SUMMARY OF THE INVENTION

The present invention relates generally to a tax refund system, and more particularly, to a system in which a taxpayer receives a loan based on his or her estimated tax refund prior to the year end holidays of the calendar year preceding the year in which the taxpayer files his or her tax return forms. In a preferred embodiment of the present invention a taxpayer may have an estimated refund amount in their possession prior to the December holidays and prior to filing his or her tax return forms for that tax year.

Tax refunds are available when a taxpayer pays too much tax during a tax year. By completing tax return forms and filing them with the proper taxing authority, the taxpayer may receive a refund for the amount overpaid. Often taxpayers use tax preparation companies to prepare and electronically file their tax return forms with the taxing authority. In circumstances where a taxpayer has used a tax preparation company on repeated and consecutive years, the tax preparation company may be able to estimate the amount of a tax refund the taxpayer will be entitled to receive for the current tax year, prior to the completion of that tax year. By doing a trend analysis as well as looking at current year income levels, the tax preparation company can arrive at a reasonable approximation of the amount of tax refund the taxpayer will be entitled to receive for that tax year. In exchange for the taxpayer assigning the tax refund amount to the tax preparation company or lending entity, the tax preparation company by itself or through a financial institution may provide the taxpayer with a loan in an amount less than, or equal to or greater than the estimated tax refund amount due the taxpayer for that tax year.

Refund anticipation loans are known, in which a taxpayer receives a loan in anticipation of a tax refund due. However, in these situations the tax information is completed for the tax year for which the refund is due prior to the loan being granted to the taxpayer. In other words, the tax preparation company has completed the tax return forms necessary to file with the taxing authority before the loan is approved. This is contrary to the present invention in which the tax return forms are not able to be completed because the year end information is not yet known. Instead, with the present invention, a loan is provided to the taxpayer based on trend analysis from prior year's tax returns as well as other personal information supplied by the taxpayer. In this manner, with the present invention, taxpayers may receive a loan prior to the year-end holidays in order to be able to spend the anticipated tax refund for holiday shopping.

The present invention will be described in greater detail hereinafter. The present invention is described in the form of preferred embodiments and is not to be limited to those preferred embodiments but instead shall be given the broadest scope of protection affordable under the law in view of the allowed claims.

DETAIL DESCRIPTION OF PREFERRED EMBODIMENT(S)

Figure 1:
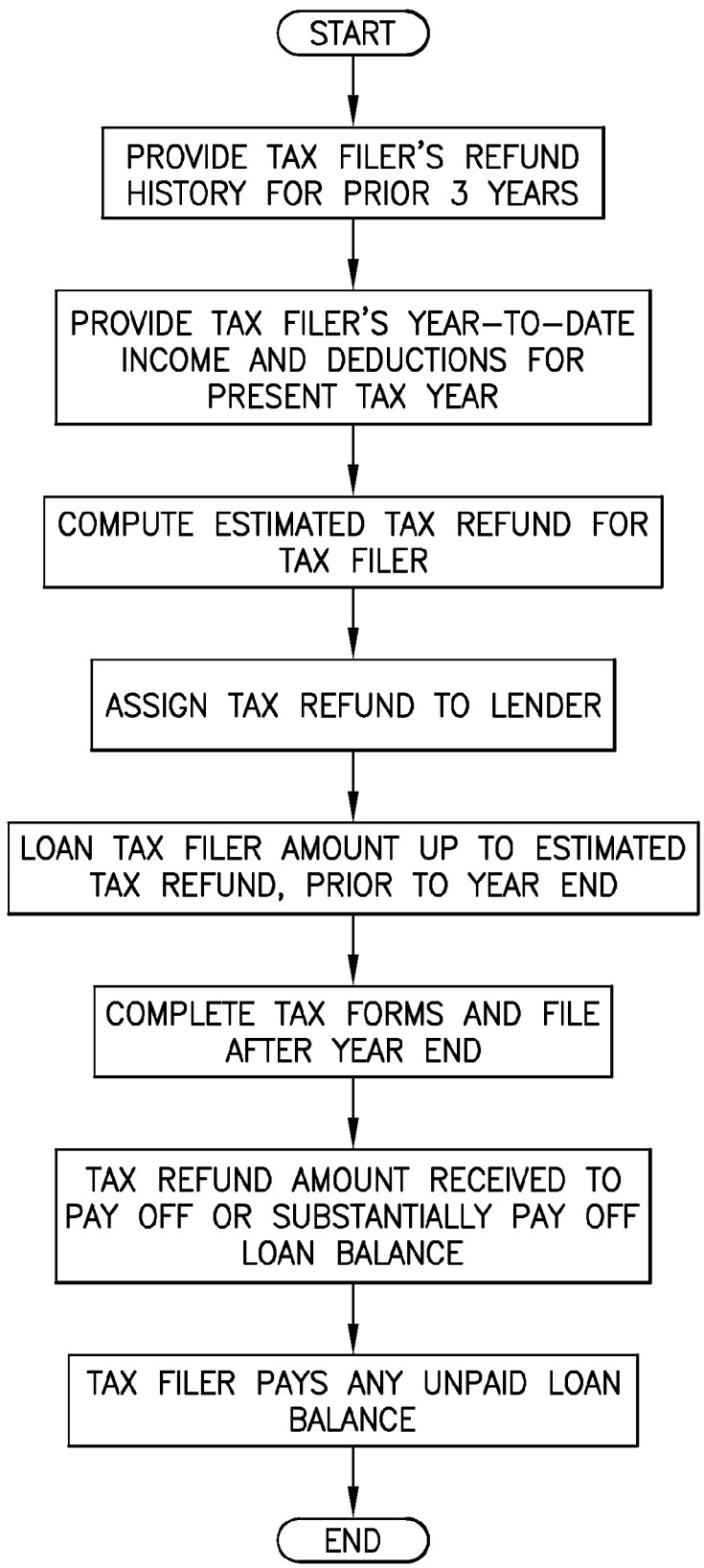
FIG. 1 is a flow diagram of a preferred embodiment of the present invention.
Figure 2:
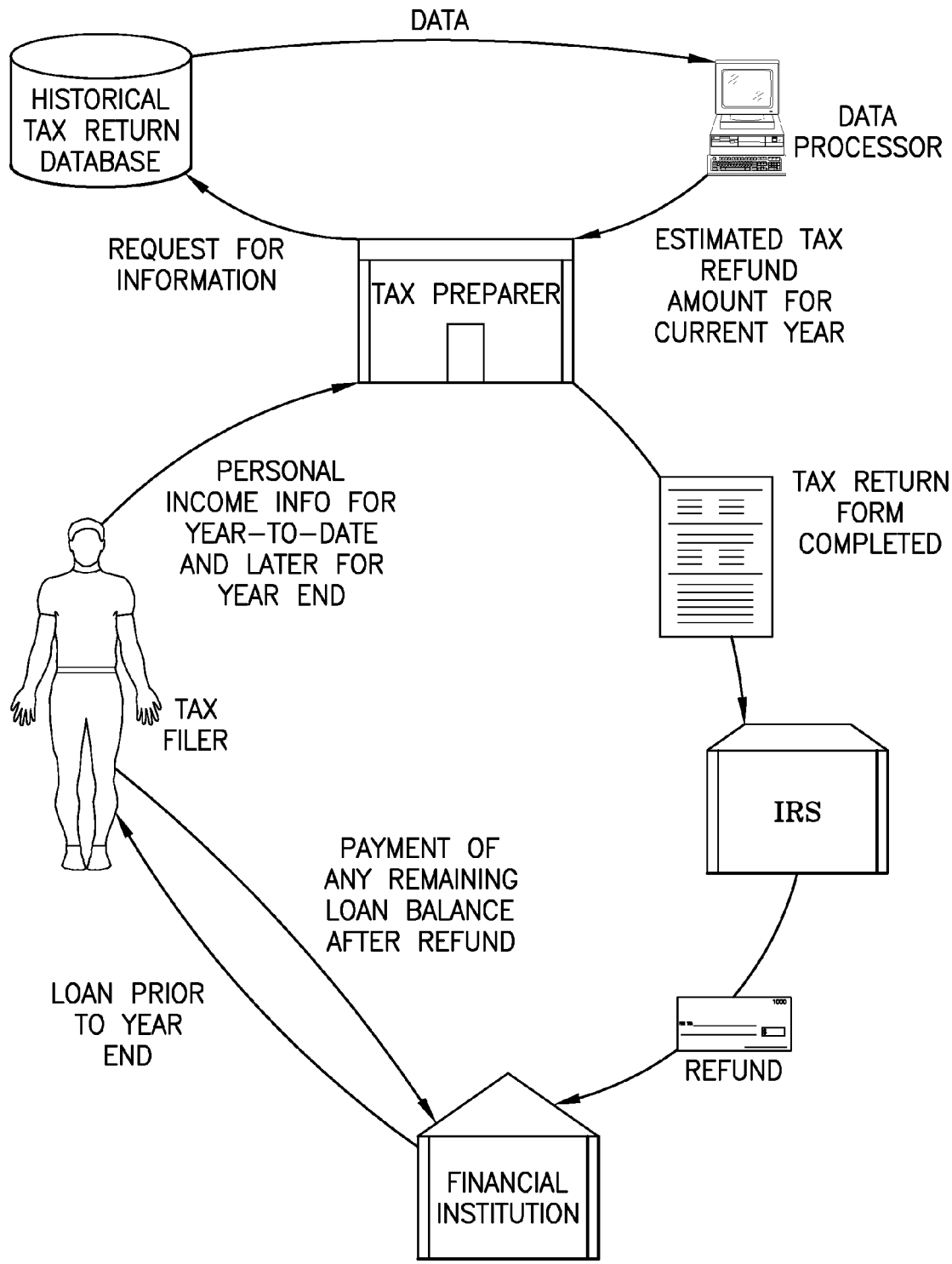
FIG. 2 is a schematic view of a preferred embodiment of the system of the present invention.

Referring now to the drawings, there is shown a preferred embodiment of the system of the present invention. With the present invention, a taxpayer may receive a loan in an amount estimated to be approximately the amount the taxpayer will receive in his or her tax refund from the taxing authority, and the loan will be given to the taxpayer prior to the end of the tax year (for example, the calendar year end), in time for the taxpayer to use the money for holiday expenses. Furthermore, because the loan is being given before the end of the tax year the taxpayer cannot yet file his or her tax return forms with the taxing authority because all of the information necessary to process the tax forms is not yet available.

In order to accomplish the present invention, a lending company preferably knows the estimated tax refund amount that the taxpayer should receive in subsequent months after filing his or her tax return. In order to do this, the loan granting entity preferably looks at the historical tax refund amount for that taxpayer. In other words, the loan granting entity may review recent years historical tax refund data for the taxpayer. In a preferred embodiment of the present invention the lending entity examines the last three years tax overpayments refunded to the taxpayer. With historical data the lending entity preferably then looks at the year to date income and other personal data for the taxpayer for that tax year. With the historical data and the year to date data for the current tax year, the loan granting entity can estimate with reasonable accuracy the tax refund amount that will be due the taxpayer for the current tax year. Under the present invention the lending entity preferably uses the first three quarters of the year or more, of year to date information from the taxpayer for the current tax year. With three quarters of the current tax year information available to the loan granting entity and with the historical tax data the lending entity is able to arrive at a reasonably accurate tax return amount due the taxpayer for the current tax year once the current tax year is over.

The lending entity may use computer software specially designed to assist in making the needed calculations to determine the estimated tax return amount due the taxpayer. Furthermore, the information used by the lending entity (such as the historical tax data) may be supplied by the taxpayer electronically, such as via a computer network, such as the Internet. Or, the taxpayer may supply the information in person at the lending office or elsewhere and the necessary calculations may be done manually such as accomplished in traditional tax preparation offices.

A preferred embodiment of the present invention will now be described in the way of an example. A taxpayer wishes to receive a pre-holiday loan in anticipation of his or her tax refund for the current tax year. The taxpayer takes his or her information to a tax preparer and/or to a lending entity offering the system of the present invention. In this example, the taxpayer provides the tax preparer with his or her last three years of tax return data, which would include the taxpayer's prior three years tax returns. If the taxpayer has used the same tax preparer for those prior three years, the tax preparer may have maintained a database of tax return information for that taxpayer as well as other taxpayers served by that tax preparer. In the latter case, the taxpayer would not have to supply the tax preparer with prior years tax information since the tax preparer would have that information readily available in a computerized database. For this example, assume that the taxpayer had an income of $32,000 in year 1996 and a $1,500 tax refund for that tax year. In 1997, assume that the taxpayer had a $34,000 annual income and a tax refund amount of $1,600. In 1998, assume that the taxpayer had an income of $38,500, and a tax refund amount of $1,850. Also assume that the taxpayer has given the tax preparer information for the current tax year that his or her income for the first nine months of the year has been $30,000. Extrapolating the current year to date income information, the tax preparer may assume that the taxpayer will earn $40,000 for the current year. If the taxpayer's tax deductions are not likely to significantly change for the current tax year, as compared to the prior three tax years, then a tax preparer may assume that the tax owed for the current tax year will be about the same percentage of income as in the prior three years, assuming that the tax rates have not changed. The tax preparer would also receive information about the nine months taxes paid by the taxpayer for the current tax year. If the taxpayer was having taxes withheld at the same rate as the prior three years, and factoring in the tax rates set by the taxing authority, after running the calculation to estimate the current tax year tax refund, the tax preparer may conclude that the taxpayer will receive a $1,900 tax refund for the current tax year after the current tax year is completed.

With this information, either the tax preparer or another lending entity may agree to provide the taxpayer with a tax refund loan in advance of the year end holidays for the current tax year. The process for granting loans in anticipation of a tax refund is well known to one of ordinary skill in the art. The unique distinctions with respect to the present invention are that the loan is granted before the end of the current tax year which to the present inventor's knowledge has never been done before, and the fact that the loan is granted on an estimated tax refund amount as opposed to being based on an actual completed tax form for a complete tax year.

The lending entity may be any entity able to process and supply the loan to the taxpayer. In a preferred embodiment the lending entity is a financial institution such as a bank or savings and loan. However, the lending entity would not have to be a financial institution and could be practically any entity able to loan money to a taxpayer. A professional tax preparer is also not essential to the purpose of the present invention, however it is preferred to use a professional tax preparer, such as H & R Block Tax Services. It is preferred to use a professional tax preparer because the taxpayer may have a prior relationship with the tax preparer and the tax preparer may have maintained a database of tax information related to that taxpayer. However, it should be recognized that the present invention may be accomplished without the services of a professional tax preparer. In another embodiment of the present invention a taxpayer may supply a lending entity with prior years tax return information for that taxpayer as well as year to date current tax year information to enable the lending entity to use the process of the present invention to provide the taxpayer with a pre-holiday current year loan in advance of the completion of the current tax year.

Having shown and described a preferred embodiment of the present invention, those skilled in the art will realize that many variations and modifications may be made to the described invention and still be within the scope of the claimed invention. Thus many of the elements indicated above may be altered or replaced by different elements which will provide the same or substantially the same result and fall within the spirit of the claimed invention. It is the intention therefore to limit the invention only as indicated by the scope of the claims.

What is claimed is:

1. A computerized method for issuing a loan to a taxpayer, comprising:
   (a) receiving at a first computer personal tax data from said taxpayer;
   (b) accessing at said first computer a database to locate in said database prior year tax refund data;
   (c) calculating at said first computer an approximate tax refund said taxpayer will be entitled to receive according to said personal tax data wherein said approximate tax refund is calculated prior to estimating a tax refund for said taxpayer based on completed tax return forms for said taxpayer;
   (d) receiving at said first computer a loan amount for said taxpayer calculated according to:
      (i) said prior tax year refund data; and
      (ii) said approximate tax refund; and
   (e) receiving at said first computer data related to a loan issued to said taxpayer in said loan amount wherein said loan is issued to said taxpayer prior to calculating an estimate tax refund for said taxpayer based on completed tax return forms for said taxpayer.

2. The computerized method of claim 1 further comprising:
   (f) calculating at said first computer or a second computer an estimate tax refund for said taxpayer based on completed tax return forms for said taxpayer.

3. The computerized method of claim 2 further comprising:
   (g) electronically filing with a taxing authority said completed tax return forms for said taxpayer.

4. The computerized method of claim 1 wherein receiving at said first computer personal tax data from said taxpayer comprises receiving year-to-date income data for said taxpayer.

5. The computerized method of claim 4 wherein receiving at said first computer personal tax data from said taxpayer further comprises receiving year-to-date expense data for said taxpayer.

6. The computerized method of claim 1 wherein receiving at said first computer personal tax data from said taxpayer comprises receiving historical income tax refund data for said taxpayer for a plurality of tax years.

7. The computerized method of claim 1 wherein said loan is issued to said taxpayer prior to the end of the current tax year.

8. A computerized system for issuing a loan to a taxpayer, comprising:
   (a) a computer for:
      (1) receiving personal tax data from said taxpayer;
      (2) accessing a database to locate in said database prior year tax refund data;
      (3) calculating an approximate tax refund said taxpayer will be entitled to receive according to said personal tax data, said approximate tax refund calculated prior to estimating a tax refund for said taxpayer based on completed tax return forms for said taxpayer;
      (4) receiving at said computer a loan amount for taxpayer calculated according to:
         (i) said prior tax year refund data; and
         (ii) said approximate tax refund; and (b) a database for storing data related to a loan issued to said taxpayer in said loan amount wherein said loan is issued to said taxpayer prior to calculating an estimated tax refund for said taxpayer based on completed tax return forms for said taxpayer.

9. The computerized system of claim 8 wherein said computer calculates an estimated tax refund for said taxpayer based on completed tax return forms for said taxpayer.

10. The computerized system of claim 9 further comprising:
   an electronic completed tax return for said taxpayer for electronically filing with a taxing authority.

11. The computerized system of claim 8 wherein said personal tax data from said taxpayer comprises year-to-date income data for said taxpayer.

12. The computerized system of claim 11 wherein personal tax data from said taxpayer further comprises year-to-date expense data for said taxpayer.

13. The computerized system of claim 8 wherein personal tax data from said taxpayer comprises historical income tax refund data for said taxpayer for a plurality of tax years.

14. The computerized system of claim 8 wherein said loan issued to said taxpayer in said loan amount is issued prior to the end of the current tax year.

15. A computerized method for issuing a loan to a taxpayer, comprising:
   (a) receiving at a first computer personal tax data from said taxpayer;
   (b) accessing at said first computer a database to locate in said database prior year tax refund data;
   (c) calculating at said first computer an approximate tax refund for said taxpayer according to said personal tax data;
   (d) receiving at said first computer data related to a loan issued to said taxpayer based on said approximate tax refund and said prior year tax refund data;
   (e) estimating at said first or a second computer a tax refund for said taxpayer based on completed tax return forms for said taxpayer; and
   (f) electronically filing with a taxing authority from said first or second computer said completed tax return forms for said taxpayer.

16. The computerized method of claim 15 wherein receiving at said first computer personal tax data from said taxpayer comprises receiving year-to-date income data for said taxpayer.

17. The computerized method of claim 15 wherein receiving at said first computer personal tax data from said taxpayer comprises receiving historical income tax refund data for said taxpayer.

18. The computerized method of claim 15 wherein said loan is issued to said taxpayer prior to the end of the current tax year.

* * * * *